United States Patent [19]
Mukai et al.

[11] Patent Number: 5,201,790
[45] Date of Patent: Apr. 13, 1993

[54] FUEL CONTROL APPARATUS OF AN ENGINE

[75] Inventors: Manabu Mukai; Shigeo Kato; Shinichi Wakutani; Shoji Imai, all of Hiroshima, Japan

[73] Assignee: Mazda Motor Corporation, Hiroshima, Japan

[21] Appl. No.: 650,179

[22] Filed: Feb. 4, 1991

[30] Foreign Application Priority Data

Feb. 5, 1990 [JP] Japan .................................. 2-25707

[51] Int. Cl.⁵ .......................... F02B 27/02; F02B 37/00
[52] U.S. Cl. ........................................ 60/612; 60/312; 123/383
[58] Field of Search ................. 60/312, 601, 603, 612; 123/383

[56] References Cited

U.S. PATENT DOCUMENTS

| | | | |
|---|---|---|---|
| 2,383,979 | 9/1945 | Lysholm | 123/383 X |
| 4,962,742 | 10/1990 | Nishizawa et al. | |
| 5,003,781 | 4/1991 | Shibata et al. | 60/612 |

FOREIGN PATENT DOCUMENTS

| | | |
|---|---|---|
| 3900034 | 7/1989 | Fed. Rep. of Germany . |
| 3921965 | 1/1990 | Fed. Rep. of Germany . |
| 178752 | 7/1989 | Japan . |
| 305214 | 4/1955 | Switzerland .......................... 60/603 |

Primary Examiner—Michael Koczo
Attorney, Agent, or Firm—Sixbey, Friedman, Leedom & Ferguson

[57] ABSTRACT

A fuel control apparatus of an engine comprises fuel control means for controlling fuel supply means in such a manner that an amount of fuel supplied to the engine corresponds to an intake pressure on the basis of a signal outputted from intake pressure detecting means for detecting the intake pressure of an intake passageway, exhaust resistance changing means for changing an exhaust resistance of an exhaust passageway correspondingly to the operating condition of the engine, and correction means for correcting a supply amount of the fuel to be controlled by the fuel control means when the exhaust resistance of the exhaust passageway is changed by the exhaust resistance changing means.

12 Claims, 9 Drawing Sheets

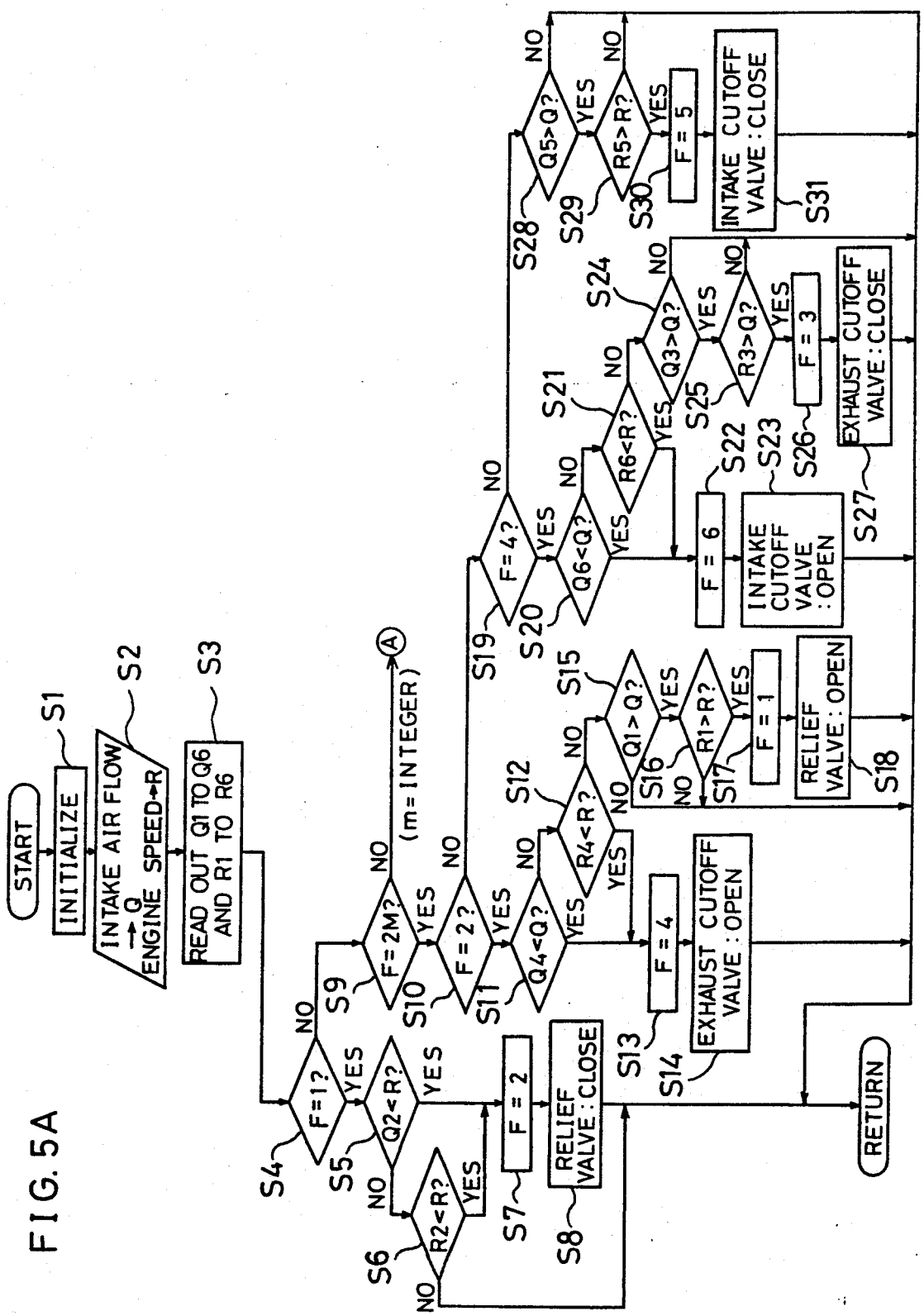

FUEL CONTROL APPARATUS OF AN ENGINE

BACKGROUND OF THE INVENTION

The present invention relates to a fuel control apparatus of an engine, and particularly to an apparatus for controlling an amount of fuel supplied to the engine correspondingly to an intake pressure.

Japanese Unexamined Patent Publication No. 59-15656 has disclosed a fuel control apparatus of an engine wherein a fuel injector is provided in an intake passageway, an intake pressure sensor for detecting the intake pressure is provided in the intake passageway on the downstream side of a throttle valve and an amount of the fuel supplied from the fuel injector is controlled on the basis of the intake pressure detected by the intake pressure sensor and an engine speed.

Conventionally, there has been known a so-called sequential turboengine comprising a supercharger. The engine has primary and secondary turbosuperchargers provided in parallel with each other in an exhaust passageway thereof and an exhaust cutoff valve provided in a special exhaust passageway for the secondary turbosupercharger. When intake flow mass is small, the exhaust cutoff valve is closed so that exhaust gas of the exhaust passageway is collectively supplied to a turbine of the primary turbosupercharger. Consequently, a supercharging pressure can be increased with good rising. When the intake flow mass is great, the exhaust cutoff valve is opened so that the exhaust gas of the exhaust passageway is collectively supplied to the turbines of the primary and secondary turbosuperchargers. Consequently, the intake flow mass can be held and a proper supercharging pressure can be obtained. Referring to the above-mentioned engine, an area of the exhaust passageway is changed depending on the opening or closing of the exhaust cutoff valve. Consequently, an exhaust resistance is changed.

In the meantime, there has been known an engine comprising a variable silencer as an exhaust device. The engine has first and second exhaust outlet pipes provided in parallel with each other in an exhaust passageway thereof. The second exhaust outlet pipe has a control valve. When the engine speed is low, the control valve is closed to exhaust the gas through only the first exhaust outlet pipe. Consequently, an exhaust resistance can be increased so that noises may be prevented from being generated in a car. When the engine speed is high, the control valve is opened to exhaust the gas through the first and second exhaust outlet pipes. Consequently, the exhaust pressure can be reduced. Also referring to the above-mentioned engine, the area of the exhaust passageway is changed depending on the opening or closing of the control valve. Consequently, the exhaust resistance can be changed.

In the case where the above-mentioned engine for controlling an amount of fuel supplied thereto according to an intake pressure has an exhaust gas resistance changing means such as the above-mentioned sequential turbosupercharger or variable silencer for changing an exhaust resistance according to the operating condition of the engine, an air fuel ratio is changed when the exhaust resistance is changed (i.e., the exhaust cutoff valve or control valve is opened or closed). By way of example, in the case where the engine speed is increased with acceleration, the resistance of the intake flow through the intake passageway is reduced if the exhaust cutoff valve or control valve is opened to reduce the exhaust resistance. Consequently, when an opening of a throttle valve is not changed, the intake flow mass is excessively increased. When the opening of the throttle valve is slightly reduced, the intake pressure is reduced. Consequently, the intake flow mass does not correspond to the intake pressure. Therefore, when a supply amount of the fuel is conventionally and uniformly controlled according to the intake pressure, the air fuel ratio is deviated from a desired value. Also in the case where the engine speed is decreased with deceleration, the air fuel ratio is deviated from the desired value.

SUMMARY OF THE INVENTION

To solve the above-mentioned problems, it is an object of the present invention to control a supply amount of fuel according to an intake pressure and to prevent an actual air fuel ratio from being deviated from a desired one when an exhaust resistance is changed by exhaust resistance changing means.

A fuel control apparatus of an engine according to the present invention comprises fuel supply means for supplying fuel to the engine, intake pressure detecting means for detecting an intake pressure of an intake passageway through which intake air is fed into the engine, fuel control means for controlling the fuel supply means in such a manner that an amount of the fuel supplied to the engine corresponds to the intake pressure on the basis of a signal outputted from the intake pressure detecting means, exhaust resistance changing means for changing an exhaust resistance of an exhaust passageway through which gas is exhausted from the engine according to the operating condition of the engine, and correction means for correcting the supply amount of the fuel to be controlled by the fuel control means when the exhaust resistance of the exhaust passageway is changed by the exhaust resistance changing means.

BRIEF DESCRIPTION OF THE DRAWINGS

FIGS. 5A and 5B are a flow chart for controlling the sequential turbosupercharger;

DETAILED DESCRIPTION OF THE INVENTION

There will be described a preferred embodiment of the present invention with reference to the drawings.

Figure 1:
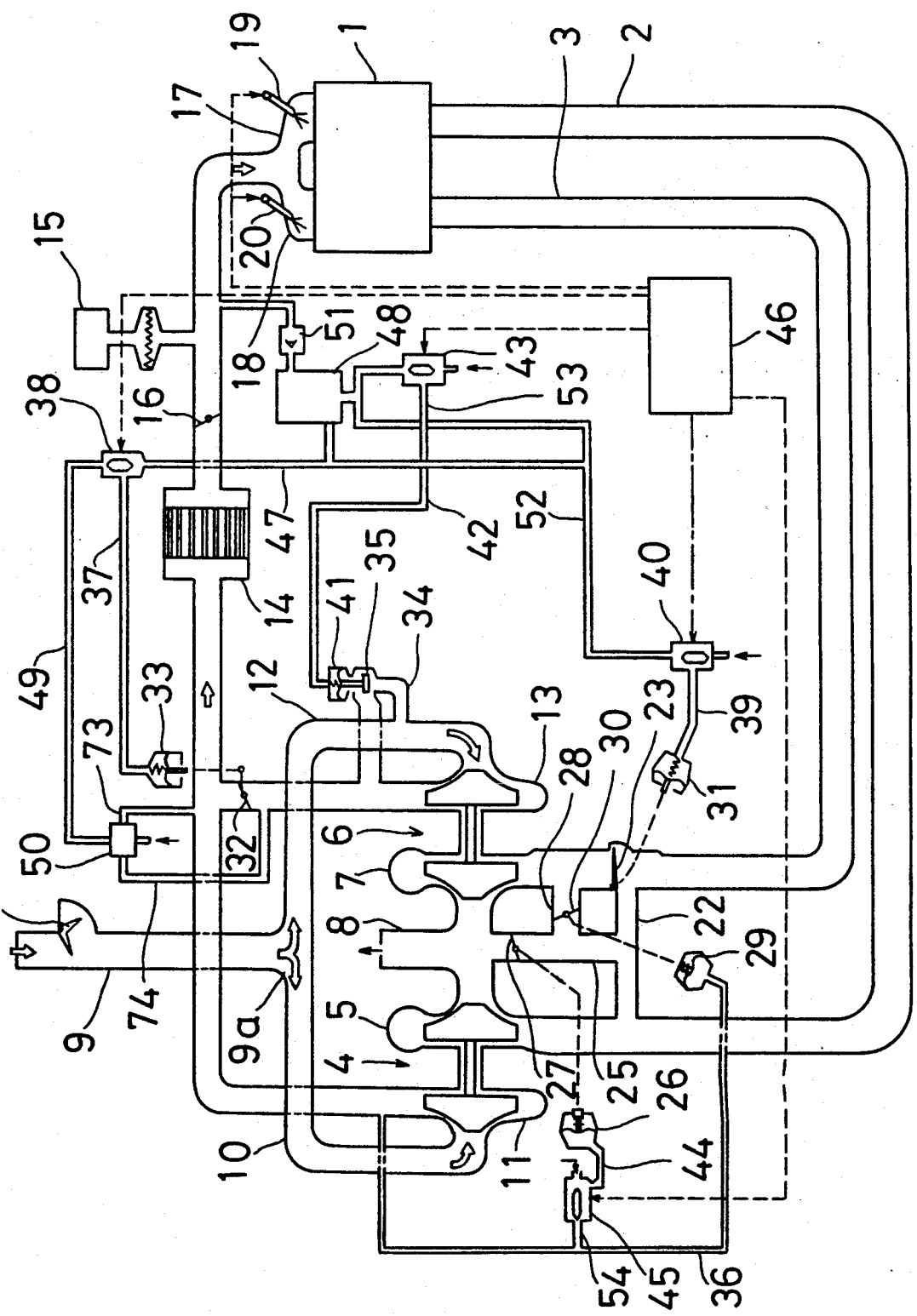
FIG. 1 is a view showing an entire system of a fuel control apparatus of an engine according to one embodiment of the present invention.

FIG. 1 shows a two cylinder engine of a fuel injection type comprising a fuel control apparatus according to one embodiment of the present invention. The two cylinder engine comprises a sequential turbosupercharger.

In FIG. 1, an engine is indicated at 1. The engine 1 has first and second exhaust passageways 2 and 3 provided independently of each other according to each cylinder. The first exhaust passageway 2 has a turbine 5 of a primary turbosupercharger 4. The second exhaust passageway 3 has a turbine 7 of a secondary turbosupercharger 6. The first and second exhaust passageways 2 and 3 join on the downstream side of the turbines 5 and 7 so as to form an exhaust passageway 8.

As intake passageway 9 branches out into two passageways on the downstream side of an air cleaner (not shown). A first branch passageway 10 has a blower 11 of the primary turbosupercharger 4 in the middle thereof. A second branch passageway 12 has a blower 13 of the secondary turbosupercharger 6 in the middle thereof. The first and second branch passageways 10 and 12 rectilinearly branch at a branch connection 9a in a direction opposite to each other and then join again on the downstream side of the blowers 11 and 13. The intake passageway 9 has an intercooler 14. The intercooler 14 has a negative pressure sensor 15 on the downstream side thereof. The negative pressure sensor 15 serves as intake pressure detecting means for detecting an intake pressure of the engine 1 and has a built-in filter. A throttle valve 16 is provided between the intercooler 14 and the negative pressure sensor 15. A downstream end of the intake passageway 9 branches out into two independent intake passageways 17 and 18 which correspond to each cylinder of the engine 1. The independent intake passageways 17 and 18 are connected to intake ports (not shown). In addition, the independent intake passageways 17 and 18 have injectors 19 and 20 for fuel injection which serve as fuel supply means for supplying the fuel to the engine 1. An air flow meter 21 for detecting intake air flow is provided on the upstream side of the branch connection 9a of the first and second branch passageways 10 and 12 in the intake passageway 9.

The first and second exhaust passageways 2 and 3 are communicated with each other through a relatively small communication passage 22 on the upstream side of the primary and secondary turbosuperchargers 4 and 5. An exhaust cutoff valve 23 is provided on the directly downstream side of a connection of the second exhaust passageway 3 to the communication passageway 22.

There is provided a bypass passageway 25 for communicating the communication passageway 22 with the exhaust passageway 8. The bypass passageway 25 has a waste gate valve 27 linked to a diaphragm actuator 26.

There is provided a second bypass passageway 28 for communicating a portion upstream to the waste gate valve 27 of the bypass passageway 25 with a portion downstream to the exhaust cutoff valve 23 of the second exhaust passageway 3. The bypass passageway 28 has an exhaust bypass valve 30 linked to a diaphragm actuator 29.

The exhaust cutoff valve 23 is linked to a diaphragm actuator 31. The second branch passageway 12 has an intake cutoff valve 32 provided on the downstream side of the blower 13. The intake cutoff valve 32 is a butterfly valve which is linked to a diaphragm actuator 33.

The second branch passageway 12 has a relief passageway 34 which bypasses the blower 13. The relief passageway 34 has a diaphragm intake relief valve 35.

A pressure chamber of the actuator 29 for operating the exhaust bypass valve 30 is connected through a conduit 36 to the downstream side of the blower 11 in the first branch passageway 10. When a pressure is equal to or greater than a predetermined value on the downstream side of the blower 11, the actuator 29 is operated to open the exhaust bypass valve 30. If the exhaust cutoff valve 23 is closed, a small amount of exhaust gas flows through the bypass passageway 25 so as to be supplied to the turbine 7 of the secondary turbosupercharger 6. Accordingly, the secondary turbosupercharger 6 starts to be rotated preliminarily before the exhaust cutoff valve 23 is opened. During this time, the intake relief valve is opened as described below. Consequently, the rotation of the secondary turbosupercharger 6 is increased so that transient response may be improved when the exhaust cutoff valve 23 is opened. As a result, a torque shock can be relieved.

A pressure chamber of the actuator 33 for operating the intake cutoff valve 32 is connected to an output port of a three-way solenoid valve 38 through a conduit 37. The actuator 31 for operating the exhaust cutoff valve 23 is connected to an output port of a three-way solenoid valve 40 through a conduit 39. A pressure chamber of an actuator 41 for operating the intake relief valve 35 is connected to an output port of a three-way solenoid valve 43 through a conduit 42. As described below, the intake relief valve 35 makes the relief passageway 34 be kept open until the exhaust and intake cutoff valves 23 and 32 are opened. Consequently, when the secondary turbosupercharger 6 is rotated preliminarily by the exhaust gas flowing through the bypass passageway 28, a pressure is increased on the upstream side of the intake cutoff valve 32 so that the engine 1 can be prevented from entering a surging region and the rotation of the blower 13 can be increased.

The actuator 26 for operating the waste gate valve 27 is connected to an output port of a three-way solenoid valve 45 through a conduit 44.

The above-mentioned three-way solenoid valves 38, 40, 43 and 45, and injectors 19 and 20 are controlled by a control unit 46 having a built-in CPU. Inputted to the control unit 46 are an engine speed R, intake air flow Q, a throttle valve opening TVO, a supercharging pressure P1 of intake air on the downstream side of the blower 11 of the primary turbosupercharger 4, and the like. The following control is carried out on the basis of the above-mentioned data.

The three-way valve 38 for controlling the intake cutoff valve 32 has one of input ports connected to a negative pressure tank 48 through a conduit 47, and the other input port connected to an output port 70 (see FIG. 2) of a pressure difference detecting valve 50 through a conduit 49. An intake negative pressure on the downstream side of the throttle valve 16 is fed into the negative pressure tank 48 through a check valve 51. The three-way valve 40 for controlling the exhaust cutoff valve 23 has one of input ports opened to the air, and the other input port connected to the conduit 47 through a conduit 52. The three-way valve 43 for controlling the intake relief valve 35 has one of the input ports connected to the negative pressure tank 48, and the other input port connected through a conduit 53 to the intake passageway 9 on the downstream side of the throttle valve 16. The three-way valve 45 for controlling the waste gate valve 27 has one of the input ports opened to the air, and the other input port connected to the conduit 36 through a conduit 54.

Figure 2:
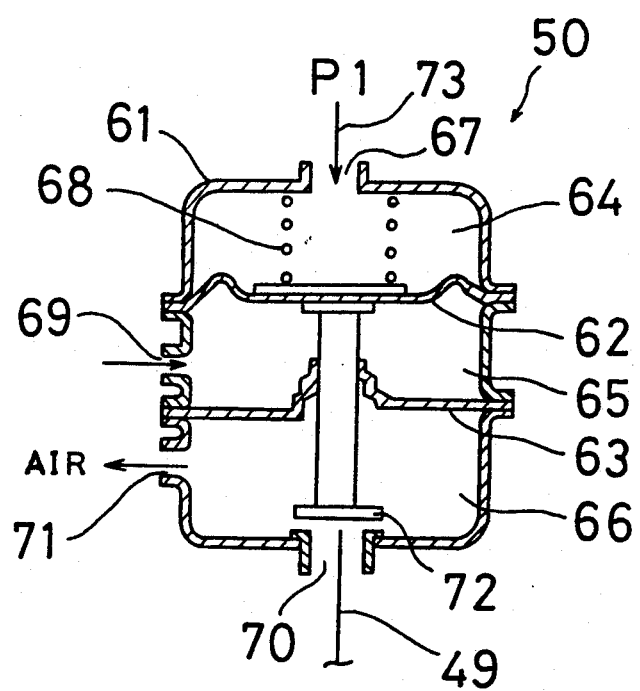
FIG. 2 is a cross-sectional view of a differential pressure detecting valve provided in the fuel control apparatus of an engine.

As shown in FIG. 2, the pressure difference detecting valve 50 has a casing 61 partitioned into three chambers 64, 65 and 66 by means of first and second diaphragms 62 and 63. The first chamber 64 has a first input port 67. A compression spring 68 is provided between an inner wall on one end of the casing 61 and the first diaphragm 62. The second chamber 65 has a second input port 69. The third chamber 66 has an output port 70 in the center of a wall on the other end side of the casing 61 and an air opening port 71 on a side wall of the casing 61. The first diaphragm 62 has a valve body 72 fixed thereto. The valve body 72 penetrates the second diaphragm 63 and extends toward the output port 70 of the third chamber 66.

The first input port 67 is connected to the downstream side of the intake cutoff valve 32 (see FIG. 1) through a conduit 73 in order to feed intake air having the supercharging pressure P1, which flows through the downstream side of the blower 11 of the primary turbosupercharger 4, into the first chamber 64. The second input port 69 is connected to the upstream side of the intake cutoff valve 32 through a conduit 74 in order to feed intake air having a pressure P2, which flows through the upstream side of the closed intake cutoff valve 32, into the second chamber 65. When a difference between the supercharging pressure P1 and the pressure P2 of the intake air fed through the input ports 67 and 69 is equal to or greater than a predetermined value, the valve body 72 opens the output port 70. The output port 70 is connected through the conduit 49 to one of the input ports of the three-way valve 38 for controlling the intake cutoff valve 32. Accordingly, when the conduit 37 is communicated with the conduit 49 through the three-way valve 38 and a differential pressure P2−P1 is greater than a predetermined value, the air is fed into the actuator 33 to open the intake cutoff valve 32. When the conduit 37 is communicated with the conduit 47 through the three-way valve 38, a negative pressure is applied to the actuator 33 to close the intake cutoff valve 32.

When the conduit 39 is communicated with the conduit 52 through the three-way valve 40 for controlling the exhaust cutoff valve 23, the negative pressure is applied to the actuator 31 to close the exhaust cutoff valve 23. When the three-way valve 40 makes the conduit 39 open to the air, the exhaust cutoff valve 23 is opened so that supercharging is carried out by the secondary turbosupercharger 6.

Figure 3:
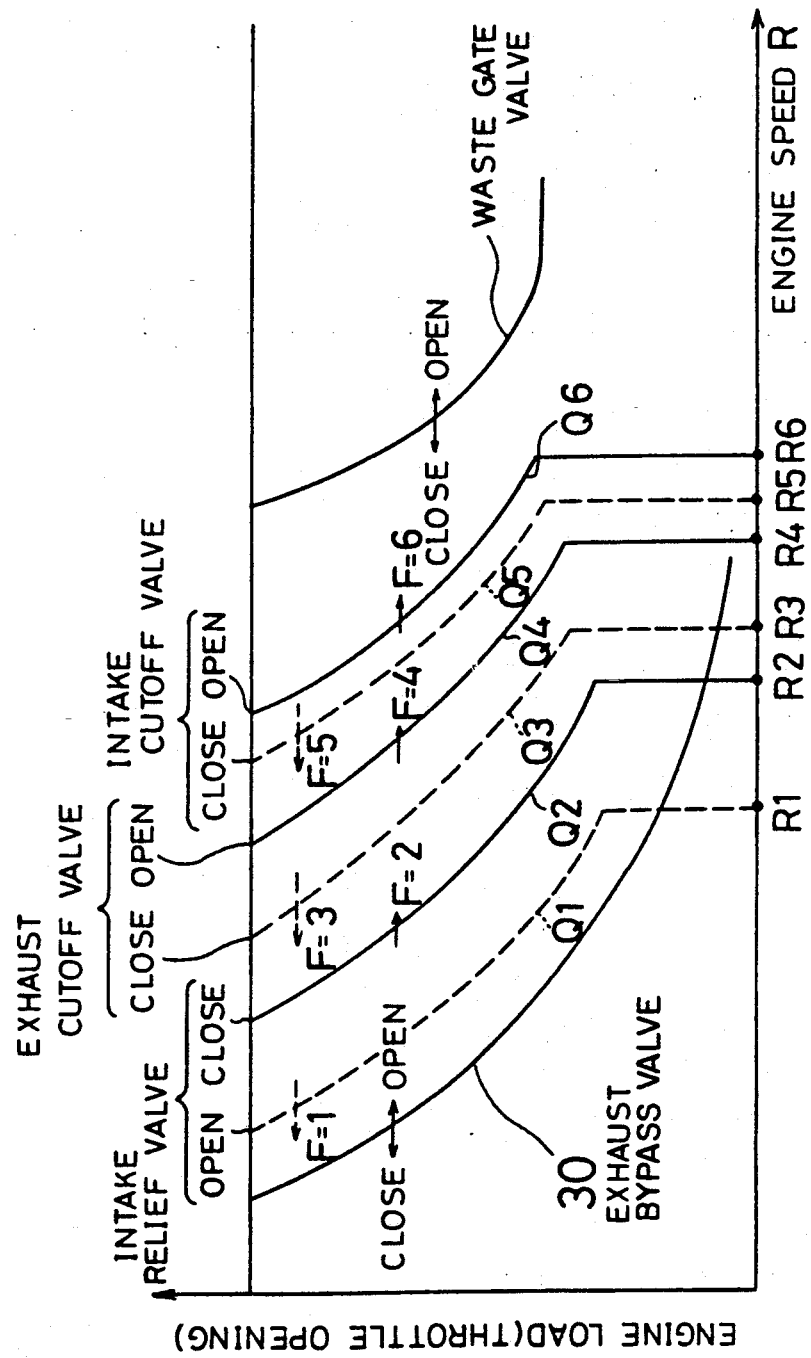
FIGS. 3 and 4 are characteristic charts for controlling a sequential turbosupercharger provided in the fuel control apparatus of an engine.
Figure 4:
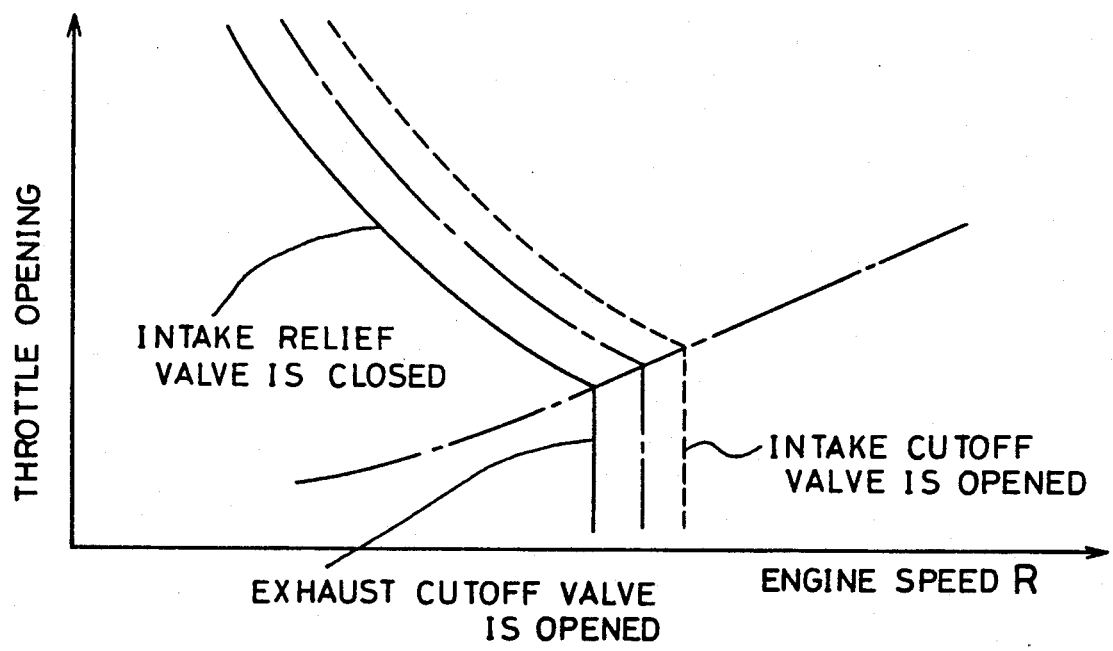

FIG. 3 is a control map showing the opening and closing of the intake cutoff valve 32, exhaust cutoff valve 23, intake relief valve 35 and waste gate valve 27, and that of the exhaust bypass valve 30. The map is stored in the control unit 46. The three-way solenoid valves 38, 40, 43 and 45 are controlled on the basis of the map.

In a low intake air flow region in which the engine speed R is low or the intake air flow Q is small, the intake relief valve 35 is opened. When the exhaust bypass valve 30 is opened, the secondary turbosupercharger 6 is rotated preliminarily. When a line of the intake air flow Q2 or the engine speed R2 is reached, the intake relief valve 35 is closed. Then, a pressure is increased on the downstream side of the blower 13 of the secondary turbosupercharger 6 until the exhaust cutoff valve 23 is opened. When a line of the intake air flow Q4 or the engine speed R4 is reached, the exhaust cutoff valve 23 is opened. When a line of the intake air flow Q6 or the engine speed R6 is reached, the intake cutoff valve 32 is opened. Consequently, the supercharging is started by the secondary turbosupercharger 6. If the line Q6-R6 is exceeded, the supercharging is carried out by both the primary and secondary turbosuperchargers 4 and 6.

The intake cutoff valve 32, exhaust cutoff valve 23 and intake relief valve 35 are changed over from the high intake air flow region into the low intake air flow region with slight hysteresis, i.e., beyond lines Q5-R5, Q3-R3 and Q1-R1 shown by broken lines in FIG. 3.

Broken portions of the above-mentioned lines are provided on a non-load or low load line.

When the engine speed R and the throttle valve opening TVO are equal to or greater than predetermined values and the intake supercharging pressure P1 on the downstream side of the blower 11 of the primary turbosupercharger 4 is equal to or greater than a predetermined value, the waste gate valve 27 is opened.

Figure 5B:
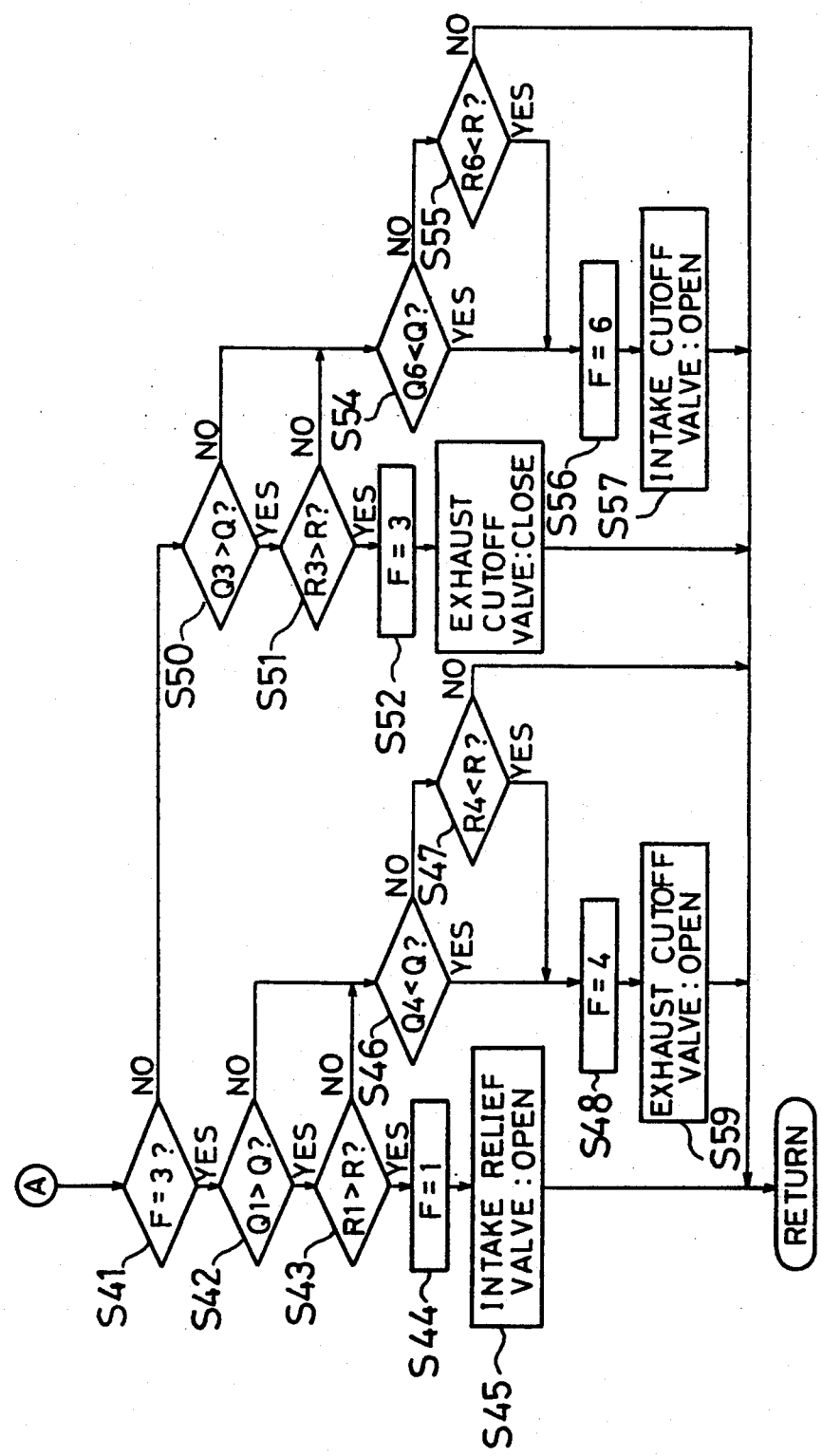

FIGS. 5A and 5B are flow charts for controlling the intake cutoff valve 32, exhaust cutoff valve 23 and intake relief valve 35 in the present embodiment. In FIGS. 5A and 5B, S and F represent a step and a flag, respectively. A state of each flag (F=1 to 6) is set as shown in FIG. 3. F=1 corresponds to the case where the last conversion is the conversion from the high air flow side to the low air flow side beyond the line Q1-R1. F=2 corresponds to the case where the last conversion is the conversion from the low air flow side to the high air flow side beyond the line Q2-R2. F=3 corresponds to the case where the last conversion is the conversion from the high air flow side to the low air flow side beyond the line Q3-R3. F=4 corresponds to the case where the last conversion is the conversion from the low air flow side to the high air flow side beyond the line Q4-R4. F=5 corresponds to the case where the last conversion is the conversion from the high air flow side to the low air flow side beyond the line Q5-R5. F=6 corresponds to the case where the last conversion is the conversion from the low air flow side to the high air flow side beyond the line Q6-R6.

In FIG. 5A, initialization is executed at Step S1. At this time, a flag F is set to be 1.

At Step S2, intake air flow Q and an engine speed R are inputted. At Step S3, map values Q1 to Q6 and R1 to R6 are read out.

At Step S4, it is decided whether the flag F is equal to 1, i.e., the last conversion is the conversion from the high air flow side to the low air flow side beyond the line Q1-R1. Since the flag F is equal to 1 at first, the result of decision is YES. If the flag F is equal to 1, it is decided whether the intake air flow Q is greater than Q2 at Step S5. If the result of decision is NO, it is decided whether the engine speed R is greater than R2 at Step S6. If the result of decision is YES in Step S5 or S6, the flag F is set to be 2 at Step S7. At Step S8, the intake relief valve 35 is controlled to be closed (a positive pressure is applied to the actuator). If the result of decision is NO in Steps S5 and S6, this routine returns to Step S1.

If the result of decision is NO in Step S4, this routine proceeds to Step S9 at which it is decided whether the flag F is an even number, i.e., the last conversion is the conversion from the low air flow side to the high air flow side beyond any line. If the result of decision is YES in Step S9, it is decided whether the flag F is equal to 2, i.e., the last conversion is the conversion from the low air flow side to the high air flow side beyond the line Q2-R2 at Step S10. If the flag F is equal to 2, this routine proceeds to Step S11.

At Step S11, it is decided whether Q is greater than Q4. If the result of decision is NO, it is decided whether R is greater than R4 at Step S12. If the result of decision is YES in Step S11 or S12, the flag F is set to be 4 at Step S13. At step S14, the exhaust cutoff valve 23 is controlled to be opened (the negative pressure is applied to the actuator).

If the result of decision is NO in Steps S11 and S12, it is decided whether Q is smaller than Q1 at Step S15.

If the result of decision is YES in Step S15, it is decided whether R is smaller than R1 at Step S16. If the result of decision is YES, the flag F is set to be 1 at Step S17 and the intake relief valve 35 is controlled to be opened at Step S18 (the negative pressure is applied to the actuator). If the result of decision is NO in Steps S15 and S16, this routine returns to Step S1.

If the result of decision is NO in Step S10, it is decided whether the flag F is equal to 4, i.e., the last conversion is the conversion from the low air flow side to the high air flow side beyond the line Q4-R4 at Step S19.

If the result of decision is YES in Step S19, it is decided whether Q is greater than Q6 at Step S20. If the result of decision is NO, it is decided whether R is greater than R6 at Step S21. If the result of decision is YES in Step S20 or S21, the flag F is set to be 6 at Step S22 and the intake cutoff valve 32 is controlled to be opened at Step S23 (the actuator is communicated with the differential pressure detecting valve side). If the result of decision is NO in Step S24 or S25, this routine returns to Step S1.

If the result of decision is NO at Step S21, it is decided whether Q is smaller than Q3 at Step S24. If the result of decision is YES, it is decided whether R is smaller than R3 at Step S25. If the result of decision is YES in Step S25, the flag F is set to be 3 at Step S26 and the exhaust cutoff valve 23 is controlled to be closed at Step S27 (the air is fed into the actuator).

If the result of decision is NO in Step S19, the flag F is equal to 6, i.e., the last conversion is the conversion from the low air flow side to the high air flow side beyond the line Q6-R6. In this case, it is decided whether Q is smaller than Q5 at Step S28. If the result of decision is YES, it is decided whether R is smaller than R5 at Step S29. If the result of decision is YES, the flag F is set to be 5 at Step S30 and the intake cutoff valve 32 is controlled to be closed at Step S31 (the negative pressure is applied to the actuator). If the result of decision is NO in Step S28 or S29, this routine returns to Step S1.

With reference to FIG. 5B, there will be described the flow to be used in the case where the result of decision is NO in Step S9.

If the result of decision is NO in Step S9, this routine proceeds to Step S41 at which it is decided whether the flag F is equal to 3, i.e., the last conversion is the conversion from the high air flow side to the low air flow side beyond the line Q3-R3. If the result of decision is YES, it is decided whether Q is smaller than Q1 at Step S42. If the result of decision is YES, it is decided whether R is smaller than R1 at Step S43. If the result of decision is YES, the flag F is set to be 1 at Step S44 and the intake relief valve 35 is controlled to be opened at Step S45.

If the result of decision is NO in Step S42 or S43, it is decided whether Q is greater than Q4 at Step S46. If the result of decision is NO, it is decided whether R is greater than R4 at Step S47. If the result of decision is YES in Step S46 or S47, the flag F is set to be 4 at Step S48 and the exhaust cutoff valve 23 is controlled to be opened at Step S49. If the result of decision is NO in Step S47, this routine returns to Step S1.

If the result of decision is NO in Step S41, the flag F is equal to 5. In this case, it is decided whether Q is smaller than Q3 at Step S50. If the result of decision is YES, it is decided whether R is smaller than R3 at Step S51. If the result of decision is YES in Step S51, the flag F is set to be 3 at Step S52 and the exhaust cutoff valve 23 is controlled to be closed at Step S53.

If the result of decision is NO in Step S50 or S51, it is decided whether Q is greater than Q6 at Step S54. If the result of decision is NO, it is decided whether R is greater than R6 at Step S55. If the result of decision is YES in Step S54 or S55, the flag F is set to be 6 at Step S56 and the intake cutoff valve 32 is controlled to be opened at Step S57. If the result of decision is NO in Step S55, this routine returns to Step S1.

According to the above-mentioned flow, exhaust passageway control means is formed in order to control the exhaust cutoff valve 23 so as to be closed when the intake air flow is small and to be opened when the intake air flow is great. The primary and secondary turbosupercharge 4 and 6, the exhaust cutoff valve 23 and the exhaust passageway control means form exhaust resistance changing means for changing an exhaust resistance correspondingly to the operating condition of the engine 1.

Figure 6:
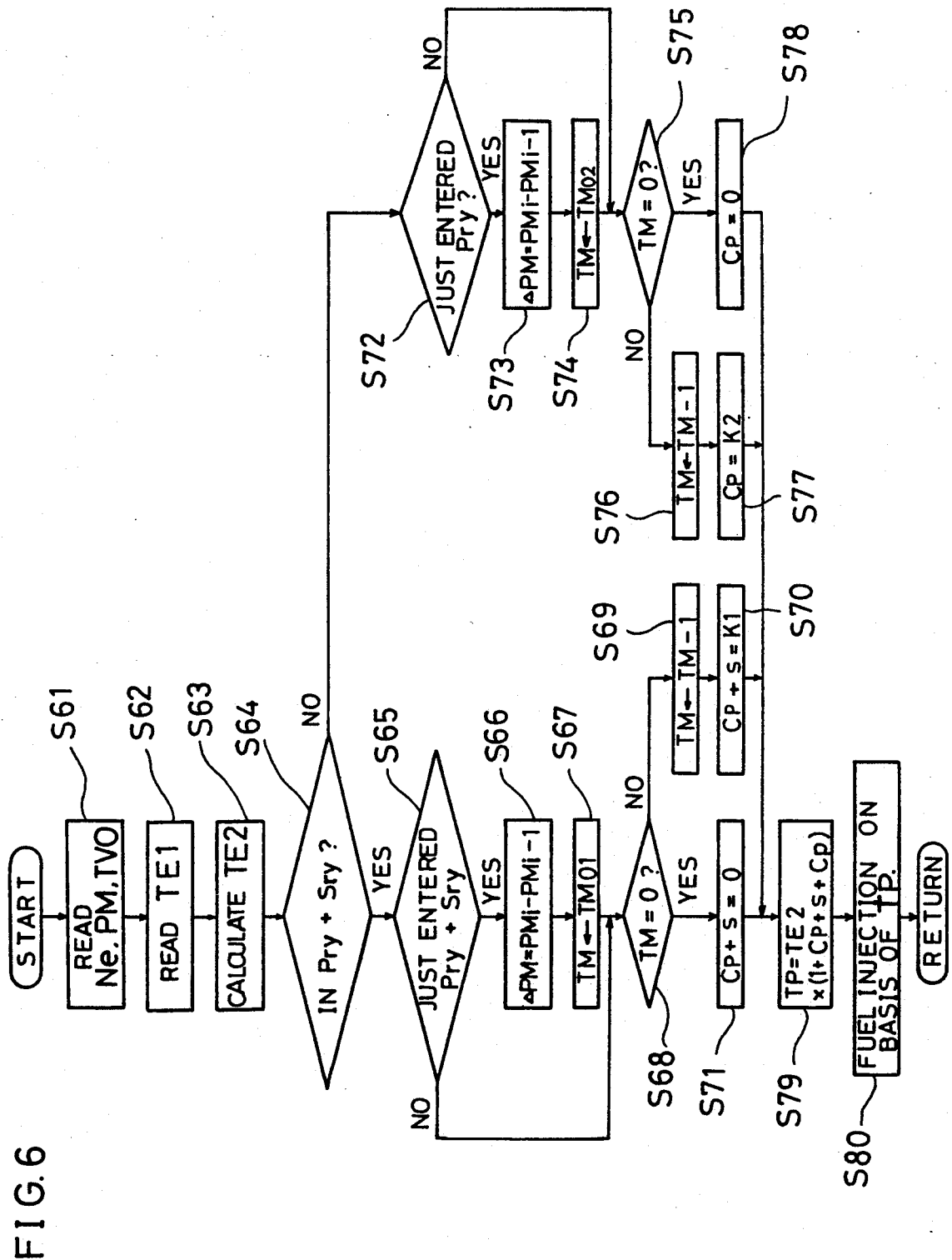
FIG. 6 is a flow chart for controlling an injection amount of fuel in the fuel control apparatus of an engine.

There will be described the control for the injectors 19 and 20 with reference to a flow chart shown in FIG. 6.

At Step S61, there are read out an engine speed Ne, an intake pressure (a boost pressure) PM, a throttle valve opening TVO and the like. At Step S62, a primary basic injection pulse width TE1 is read out of a map on the basis of the engine speed Ne and the intake pressure PM.

At Step S63, a secondary basic injection pulse width TE2 is calculated by a correction factor C which is determined by various corrections, an invalid injection time Tv and a formula, $TE2 = TE1 \times (1+C) + Tv$. At Step S64, it is decided whether the operating condition of the engine 1 resides in Pry zone in which supercharging is carried out by only the primary turbosupercharger 4 or Pry+Sry zone in which the supercharging is carried out by the primary and secondary turbosuperchargers 4 and 6.

If it is decided that the operating condition of the engine 1 resides in the Pry+Sry zone in Step S64, it is decided whether the operating condition of the engine 1 has only just entered the Pry+Sry zone at Step S65. If the engine 1 has only just entered the Pry+Sry zone, the exhaust resistance is reduced so that the exhaust pressure is reduced along with the intake pressure. At Step S66, a variation PM of the intake pressure is obtained with a formula, $PM = PM_i - PM_{i-1}$. At Step S67, a count time TM of a timer is set to $TM_{01}$. At Step S68, it is decided whether the count time TM is "0". Since the count time TM is not "0" at first, the count time TM is decreased by "1" at Step S69 and a fuel correction factor $C_{p+s}$ in the Pry+Sry zone is set to a value obtained with reference to a characteristic chart of FIG. 7 at Step S70. At Step S79, a final injection pulse width TP is obtained with a formula, $TP=TE2\times(1+C_{p+s}+C_p)$. At Step S80, the fuel is injected by the injectors 19 and 20 on the basis of the final injection pulse width TP. Then, this routine returns to Step S61. In this case, the fuel correction factor $C_p$ is "0".

If the operating condition of the engine 1 resides in the Pry+Sry zone, the result of decision is NO in Step S65. Consequently, this routine proceeds to Step S68. If the result of decision is NO in Step S68, processing is executed at Steps S69, S70, S79 and S80. When the count time TM is increased at Step S68, this routine proceeds to Step S71 at which the fuel correction factor $C_{p+s}$ is set to "0". At Step S79, the final injection pulse width TP is obtained. At Step S80, the fuel is injected by the injectors 19 and 20 on the basis of the final injection pulse width TP. Then, this routine returns to Step S61.

Figure 8:
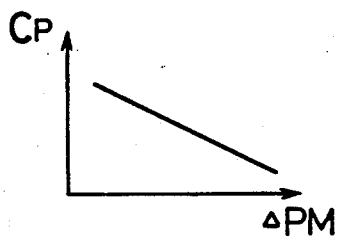
FIG. 8 is a characteristic chart of a fuel correction factor $C_p$ for controlling the injection amount of the fuel.

If it is decided that the operating condition of the engine 1 resides in the Pry zone in which the supercharging is carried out by only the primary turbosupercharger 4 in Step S64, it is decided whether the operating condition of the engine 1 has only just entered the Pry zone at Step S72. If the operating condition of the engine 1 has only just entered the Pry zone, the exhaust resistance is increased so that the exhaust pressure is increased along with the intake pressure. At Step S73, the variation PM of the intake pressure is obtained with a formula, $PM=PM_i-PM_{i-1}$. At Step S74, the count time TM of the timer is set to $TM_{02}$. At Step S75, it is decided whether the count time TM is "0". Since the count time TM is not "0" at first, the count time TM is decreased by "1" at Step S76 and the fuel correction factor $C_p$ in the Pry zone is set to a value obtained with reference to a characteristic chart of FIG. 8 at Step S77. At Step S79, the final injection pulse width TP is obtained. At Step S80, the fuel is injected by the injectors 19 and 20 on the basis of the final injection pulse width TP. Then, this routine returns to Step S61.

When the operating condition of the engine 1 resides in the Pry zone, the result of decision is NO in Step S72. Consequently, this routine proceeds to Step S75. If the result of decision is NO in Step S75, processing is executed at Steps S76, S77, S79 and S80. If the count time TM is increased at Step S75, this routine proceeds to Step S78 at which fuel correction factor $C_p$ is set to "0". At Step S79, the final injection pulse width TP is obtained. At Step S80, the fuel is injected by the injectors 19 and 20 on the basis of the final injection pulse width TP. Then, this routine returns to Step S61.

When an ignition switch is ON, the count time TM is set to "0".

In Steps S61 to S64, S79 and S80, fuel control means is formed in order to receive an output from the intake pressure detecting means (a negative pressure sensor) 15 and to control the fuel supply means (injectors) 19 and 20 so that the amount of the fuel supplied to the engine 1 corresponds to the intake pressure. In Steps S65 to S78, correction means is formed in order to correct the amount of the fuel supplied from the fuel control means (injectors) 19 and 20 when the exhaust resistance changing means is operated to change the exhaust resistance.

As described above, according to the present embodiment, the injectors 19 and 20 are controlled by the fuel control means on the basis of the intake pressure detected by the negative pressure sensor 15 so that the amount of the fuel supplied to the engine corresponds to the intake pressure.

In the low intake air flow region, the exhaust cutoff valve 23 is closed so that the exhaust gas is collectively supplied to the turbine 5 of the primary turbosupercharger 4 through the first and second exhaust passageways 2 and 3. Consequently, a supercharging pressure can be increased with good rising. In this case, the exhaust resistance is increased. On the other hand, in the high intake air flow region, the exhaust cutoff valve 23 is opened so that the exhaust gas is supplied to the turbines 5 and 7 of the primary and secondary tubosuperchargers 4 and 6 through the first and second exhaust passageways 2 and 3. Consequently, the intake air flow can be held and the proper supercharging pressure can be obtained. In this case, the exhaust pressure is reduced.

In the above-mentioned case, the correction means corrects a predetermined time and a supply amount of the fuel at the time of conversion into the supercharging region Pry+Sry zone or Pry zone. Consequently, in the case where the exhaust resistance is changed, an actual air fuel ratio can be prevented from being deviated from a desired one owing to noncorrespondence of the intake air flow to the intake pressure.

Figure 7:
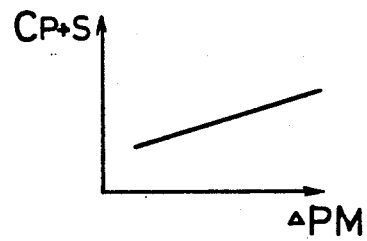
FIG. 7 is a characteristic chart of a fuel correction factor $C_{p+s}$ for controlling the injection amount of the fuel.

According to the above-mentioned embodiment, it is decided that the operating condition of the engine 1 has only just entered the Pry+Sry zone, the fuel correction factor Cp+s is set to a value obtained with reference to the characteristic chart of FIG. 7. On the other hand, it is decided that the operating condition of the engine 1 has only just entered the Pry zone, the fuel correction factor $C_p$ is set to a value obtained with reference to the characteristic chart of FIG. 8. Alternatively, when the control unit 46 outputs a signal to the three-way valve 40 in order to open the exhaust cutoff valve 23, the fuel correction factor $C_{p+s}$ may be set to a value obtained with reference to the characteristic chart of FIG. 7. On the other hand, when the control unit 46 outputs a signal to the three-way valve 40 in order to close the exhaust cutoff valve 23, the fuel correction factor $C_p$ may be set to a value obtained with reference to the characteristic chart of FIG. 8.

If the fuel is injected by the injectors 19 and 20 at the time of operation of the exhaust resistance changing means, the air fuel ratio can be prevented from being temporarily changed owing to a control delay of the injection pulse width.

While there are provided two superchargers which are exhaust turbosuperchargers in the above-mentioned embodiment, three or more superchargers may be provided. In addition, it is sufficient that at least one of the secondary superchargers which are changed in its operating condition is the exhaust turbosupercharger.

Figure 10:
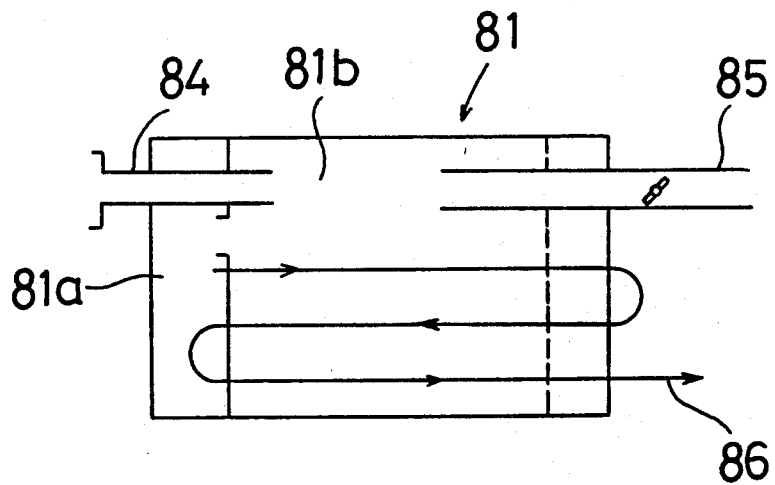
FIG. 10 is a typical view showing the flow of exhaust air in a main silencer according to the variant.
Figure 9:
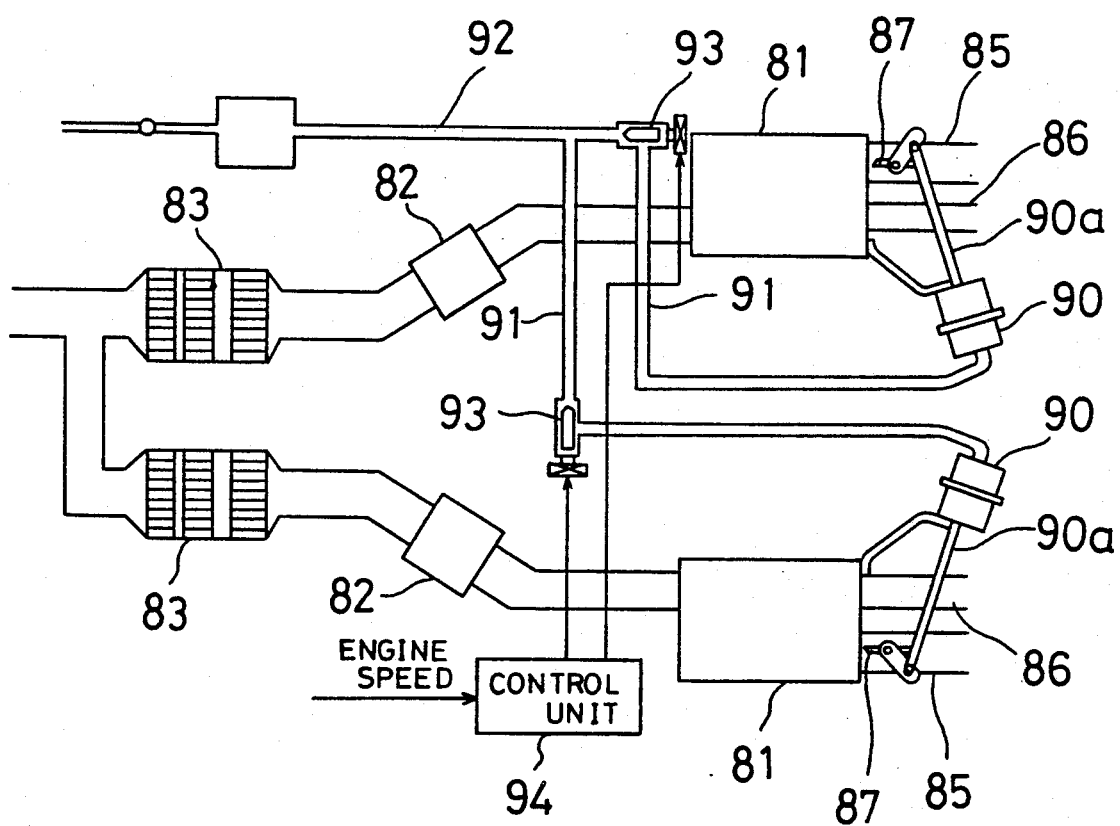
FIG. 9 is a view showing an entire system of a variable silencer in a variant of the fuel control apparatus of an engine.

There will be described a variant of the above-mentioned embodiment. While a sequential turbosupercharger is used for the exhaust resistance changing means in the above-mentioned embodiment, a variable silencer shown in FIG. 9 is used for the exhaust resistance changing means in the variant. More specifically, the variable silencer has two branched exhaust systems. Each exhaust system has a main silencer 81, a sub silencer 82 and a catalytic converter 83. As shown in FIG. 10, the inside of the main silencer 81 is partitioned into a resonance chamber 81a and an expansion chamber 81b which are communicated with each other through a communication hole. The expansion chamber 81b is communicated with the outside of the main silencer 81 through an exhaust inlet pipe 84 and a first exhaust outlet pipe 85 which are arranged approximately rectilinearly. The resonance chamber 81a is communicated with the outside of the main silencer 81 through a second exhaust outlet pipe 86. The second exhaust outlet pipe 86 has a smaller diameter than that of the first exhaust outlet pipe 85 and has one of opening ends which faces the resonance chamber 81a. In addition, the entire second exhaust outlet pipe 86 meanders in the main silencer 81 so as to form a long passageway. A sound absorbing material (not shown) is provided in the middle of the second exhaust outlet pipe 86 in the expansion chamber 81b.

With the above-mentioned structure, the main silencer 81 has a short exhaust passageway and a long exhaust passageway formed therein. The short exhaust passageway is formed in such a manner that the exhaust gas directly flows out of the first exhaust outlet pipe 85 through the exhaust inlet pipe 84 and the expansion chamber 81b. The long exhaust passageway is formed in such a manner that the exhaust gas passes through the exhaust inlet pipe 84, the expansion chamber 81b and the resonance chamber 81a and then meanders in the main silencer 81 to flow out of the second exhaust outlet pipe 86.

Returning to FIG. 9, a switching valve 87 is provided in the first exhaust outlet pipe 85. The switching valve 87 is linked to a rod 90a of an actuator 90 in order to open or close the first exhaust outlet pipe 85 according to the movement of the rod 90a. The actuator 90 is connected to an intake passageway on the downstream side of a throttle valve through a branch passageway 91 and a passageway 92, and is operative correspondingly to an intake negative pressure of the intake passageway. The branch passageway 91 has a three-way solenoid valve 93 to be controlled by a control unit 14. When the three-way solenoid valve 93 opens or closes the branch passageway 91, the operation of the actuator 90 (i.e., the switching operation of the switching valve 87) is controlled.

There will be described the control for the three-way solenoid valve 93 by the control unit 14. When the engine 1 is stopped, the switching valve 87 is opened so that the first and second exhaust outlet pipes 85 and 86 are opened.

When an engine speed is almost idle, a valve closing signal is outputted to the three-way solenoid valve 93 to close the switching valve 87 of the first exhaust outlet pipe 85. Consequently, the exhaust is carried out by only the second exhaust outlet pipe 86 of the main silencer 81. As mentioned above, the second exhaust outlet pipe 86 has a long passageway which is small in diameter and a sound absorbing material. Consequently, noises can be effectively prevented from being generated in a car.

When the engine speed is about 3500 r.p.m., a valve opening signal is outputted to the three-way solenoid valve 93 to open the switching valve 87. Consequently, the exhaust resistance is reduced so that the exhaust pressure is reduced. In addition, an exhaust flow speed is decreased so that air flow sounds, which are the cause of noises outside the car, can be prevented from being generated.

The above-mentioned variable silencer forms exhaust resistance changing means for changing the exhaust resistance correspondingly to the operating condition of the engine 1.

According to the variant, the injectors 19 and 20 are controlled similar to the fuel control in the above-mentioned embodiment. In the above-mentioned embodiment, it is decided whether the operating condition of the engine resides in the supercharging region Pry zone or Pry+Sry zone. In addition, there are corrected a time TM counted by the time after the operating condition of the engine enters the Pry+Sry zone, a time TM counted by the timer after the operating condition of the engine enters the Pry zone, and an injection amount of the fuel. According to the variant, it is decided whether the engine speed is higher than 3500 r.p.m. In addition, there are corrected a time TM counted by a timer after the engine speed becomes higher than 3500 r.p.m., a time TM counted by the timer after the engine speed becomes lower than 3500 r.p.m. and the injection amount of the fuel.

While a sequential turbosupercharger is used for the exhaust resistance changing means in the above-mentioned embodiment and a variable silencer is used for the exhaust resistance changing means in the variant, the sequential turbosupercharger and the variable silencer may be combined to form the exhaust resistance changing means.

As describe above, according to the fuel control apparatus of an engine of the present invention, the fuel supply means is controlled so that the amount of the fuel supplied to the engine corresponds to the intake pressure and the amount of the fuel supplied from the fuel supply means is corrected correspondingly to the operating condition of the exhaust resistance changing means. Consequently, when the exhaust resistance is changed, an actual air fuel ratio can be prevented from being deviated from a desired one owing to noncorrespondence of the intake air flow to the intake pressure.

Furthermore, in the case where the exhaust resistance changing means includes primary and secondary turbosuperchargers which are provided in parallel with each other in an exhaust passageway of the engine, an exhaust cutoff valve which is provided in the exhaust passageway special for the secondary turbosupercharger, and exhaust passageway control means for closing the exhaust cutoff valve when the intake air flow is small and opening the exhaust cutoff valve when the intake air flow is great, a supercharging pressure can be increased with good rising when the intake air flow is small. On the other hand, when the intake air flow is great, the intake air flow can be held and the proper supercharging pressure can be obtained. In addition, the supply amount of the fuel is corrected so that the actual air fuel ratio can be prevented from being deviated from the desired one.

What is claimed is:

1. A fuel control apparatus of an engine comprising;
   fuel supply means for supplying fuel to the engine;
   intake pressure detecting means for detecting an intake pressure of an intake passageway through which intake air is fed into the engine;
   fuel control means for controlling the fuel supply means so that an amount of the fuel supplied to the engine corresponds to the intake pressure on the basis of a signal outputted from the intake pressure detecting means;
   exhaust resistance changing means for changing an exhaust resistance of an exhaust passageway through which gas is exhausted from the engine according to the operating condition of the engine; and correction means for correcting a supply amount of the fuel to be controlled by the fuel control means when the exhaust resistance of the exhaust passageway is changed by the exhaust resistance changing means;

wherein the correction means performs correction in such a manner that the amount of fuel supplied from the fuel supply means is increased when the exhaust resistance of the exhaust passageway is reduced.

2. A fuel control apparatus of an engine according to claim 1, wherein the exhaust resistance changing means comprises;

primary and secondary turbosuperchargers which are provided in parallel with each other in the exhaust passageway of the engine, and an exhaust cutoff valve provided in an exhaust passageway through which the exhaust gas is fed into the secondary turbosupercharger for opening and closing the exhaust passageway.

3. A fuel control apparatus of an engine according to claim 1, wherein the exhaust resistance changing means is a variable silencer provided in the exhaust passageway of the engine, the variable silencer including;

short and long exhaust passageways provided in parallel with each other and having passageway lengths which are different from each other for exhausting the air from a silencer body, and a switching valve provided in the short exhaust passageway for opening and closing the short exhaust passageway.

4. A fuel control apparatus of an engine according to claim 1, wherein the fuel control means controls the fuel supply means in such a manner that the fuel is supplied from the fuel supply means to the engine when the exhaust resistance changing means is operated so as to reduce the exhaust resistance of the exhaust passageway.

5. A fuel control apparatus of an engine according to claim 1, wherein the exhaust resistance changing means includes primary and secondary turbosuperchargers which are provided in parallel with each other in the exhaust passageway of the engine, and an exhaust cutoff valve provided in an exhaust passageway through which the exhaust gas is fed into the secondary turbosupercharger for opening and closing the exhaust passageway.

6. A fuel control apparatus of an engine according to claim 1, wherein the exhaust resistance changing means is a variable silencer provided in the exhaust passageway of the engine, the variable silencer including short and long exhaust passageways provided in parallel with each other and having passageway lengths which are different from each other for exhausting the air from a silencer body and a switching valve provided in the short exhaust passageway for opening and closing the short exhaust passageway.

7. A fuel control apparatus of an engine according to claim 1, wherein the fuel control means controls the fuel supply means in such a manner that the fuel is supplied from the fuel supply means to the engine when the exhaust resistance changing means is operated so as to reduce the exhaust resistance of the exhaust passageway.

8. A fuel control apparatus of an engine according to claim 2, wherein the fuel control means controls the fuel supply means in such a manner that the fuel is supplied from the fuel supply means to the engine when the exhaust resistance changing means is operated so as to reduce the exhaust resistance of the exhaust passageway.

9. A fuel control apparatus of an engine according to claim 2, wherein the exhaust resistance changing means further includes exhaust passageway control means for closing the exhaust cutoff valve when the intake air flow to the engine is small and opening the exhaust cutoff valve when the intake air flow to the engine is great.

10. A fuel control apparatus of an engine according to claim 3, wherein the fuel control means controls the fuel supply means in such a manner that the fuel is supplied from the fuel supply means to the engine when the exhaust resistance changing means is operated so as to reduce the exhaust resistance of the exhaust passageway.

11. A fuel control apparatus of an engine according to claim 5, wherein the exhaust resistance changing means further includes exhaust passageway control means for closing the exhaust cutoff valve when the intake air flow to the engine is small and opening the exhaust cutoff valve when the intake air flow to the engine is great.

12. A fuel control apparatus of an engine according to claim 8, wherein the exhaust resistance changing means further includes exhaust passageway control means for closing the exhaust cutoff valve when the intake air flow to the engine is small and opening the exhaust cutoff valve when the intake air flow to the engine is great.

* * * * *